(12) United States Patent
Merzhaeuser et al.

(10) Patent No.: US 10,900,469 B2
(45) Date of Patent: Jan. 26, 2021

(54) METHOD TO RETROFIT A WIND TURBINE ROTOR BLADE WITH A REPLACEMENT BLADE TIP SEGMENT

(71) Applicant: General Electric Company, Schenectady, NY (US)

(72) Inventors: Thomas Merzhaeuser, Munich (DE); Rune Vestergaard, Vamdrup (DK); Bart Jan Veldkamp, Enschede (NL)

(73) Assignee: General Electric Company, Schenectady, NY (US)

( * ) Notice: Subject to any disclaimer, the term of this patent is extended or adjusted under 35 U.S.C. 154(b) by 135 days.

(21) Appl. No.: 16/174,733

(22) Filed: Oct. 30, 2018

(65) Prior Publication Data

US 2020/0132053 A1 Apr. 30, 2020

(51) Int. Cl.
*F03D 80/50* (2016.01)
*F03D 1/06* (2006.01)

(52) U.S. Cl.
CPC ........... *F03D 80/50* (2016.05); *F03D 1/0675* (2013.01); *F05B 2230/80* (2013.01)

(58) Field of Classification Search
CPC ............. F03D 1/0675; Y10T 29/49318; Y10T 29/49321; Y10T 29/49336
See application file for complete search history.

(56) References Cited

U.S. PATENT DOCUMENTS

| | | | |
|---|---|---|---|
| 2011/0020126 A1* | 1/2011 | Glenn | F03D 1/0675 416/223 A |
| 2011/0081247 A1* | 4/2011 | Hibbard | F03D 1/0675 416/226 |
| 2011/0091326 A1 | 4/2011 | Hancock | |
| 2012/0093627 A1* | 4/2012 | Christenson | F03D 13/10 415/1 |
| 2014/0286780 A1* | 9/2014 | Lemos | F03D 80/50 416/210 R |
| 2015/0369211 A1 | 12/2015 | Merzhaeuser | |
| 2017/0363063 A1* | 12/2017 | Yarbrough | F03D 9/25 |

FOREIGN PATENT DOCUMENTS

| EP | 3144526 A1 | 3/2017 |
|---|---|---|
| EP | 2957765 B1 | 8/2017 |

OTHER PUBLICATIONS

PCT Search Report, dated Feb. 6, 2020.

* cited by examiner

*Primary Examiner* — Jason L Vaughan
*Assistant Examiner* — Amanda Kreiling
(74) *Attorney, Agent, or Firm* — Dority & Manning, P.A.

(57) ABSTRACT

A method for retrofitting a wind turbine blade with a replacement blade tip segment includes producing a replacement blade tip segment with an internal beam receiver section, and producing a beam structure. The existing blade tip segment is cut away from the wind turbine blade, wherein the cut defines a chord-wise joint line at the remaining blade root segment of the wind turbine blade. The beam structure is fixed into spar structure of the blade root segment. The replacement blade tip segment is aligned and connected with the blade root segment in a span-wise direction so that the beam structure moves into the beam receiver section. A finish surface can be provided to the blade shell components of the blade root segment and the replacement tip segment at the joint line.

11 Claims, 7 Drawing Sheets

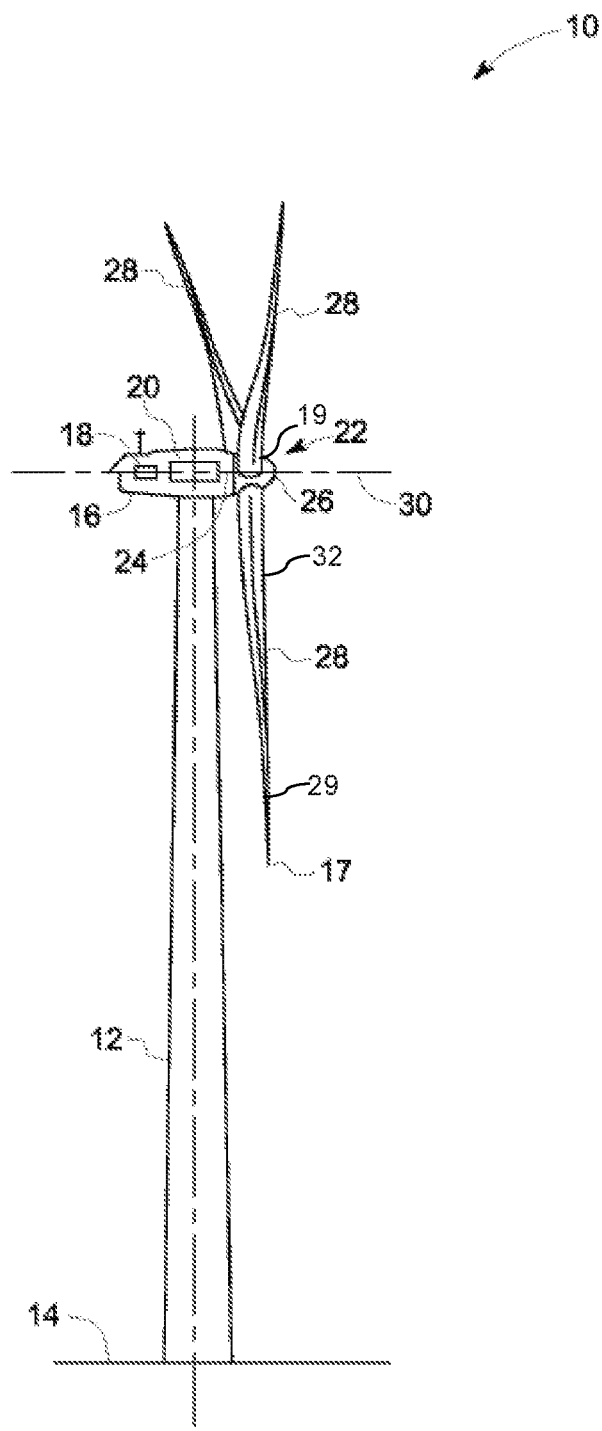
Fig. -1-

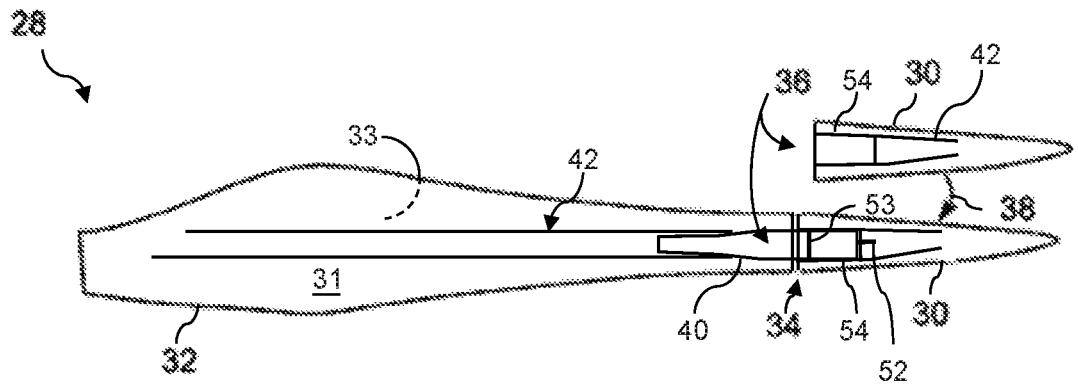
Fig. -2-
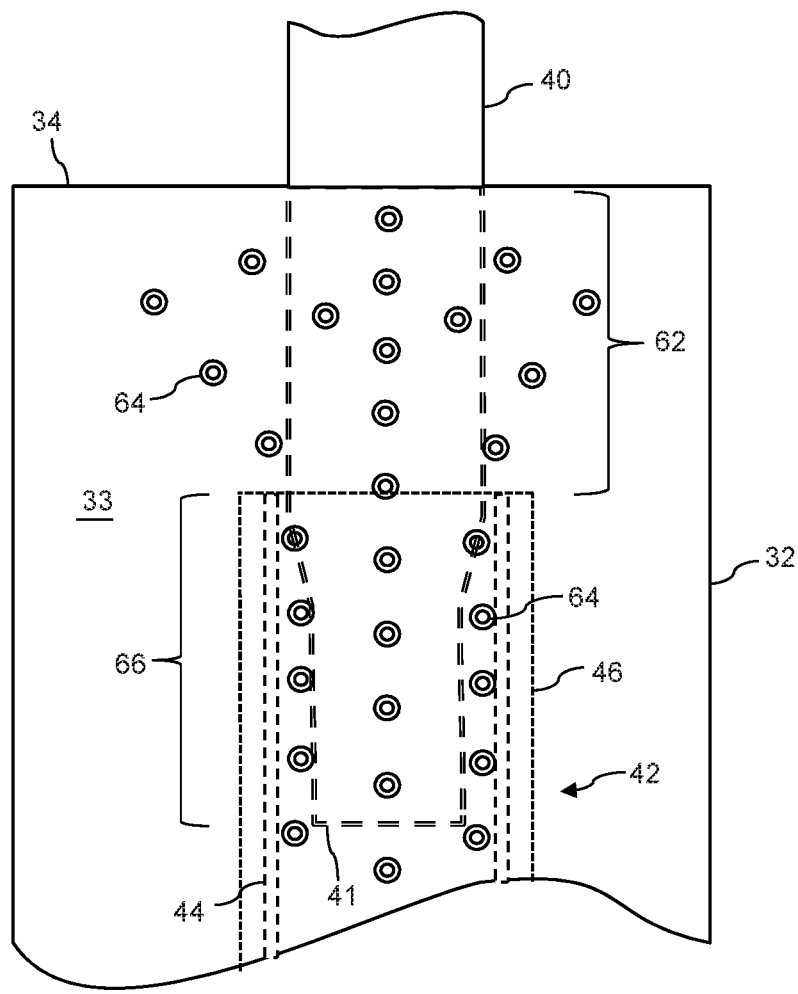
Fig. -3-

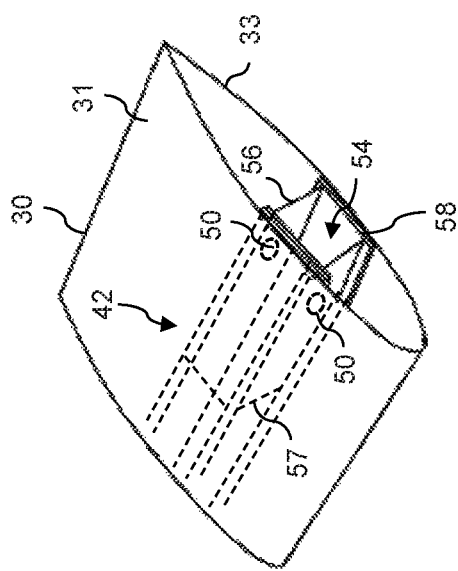
Fig. -4-
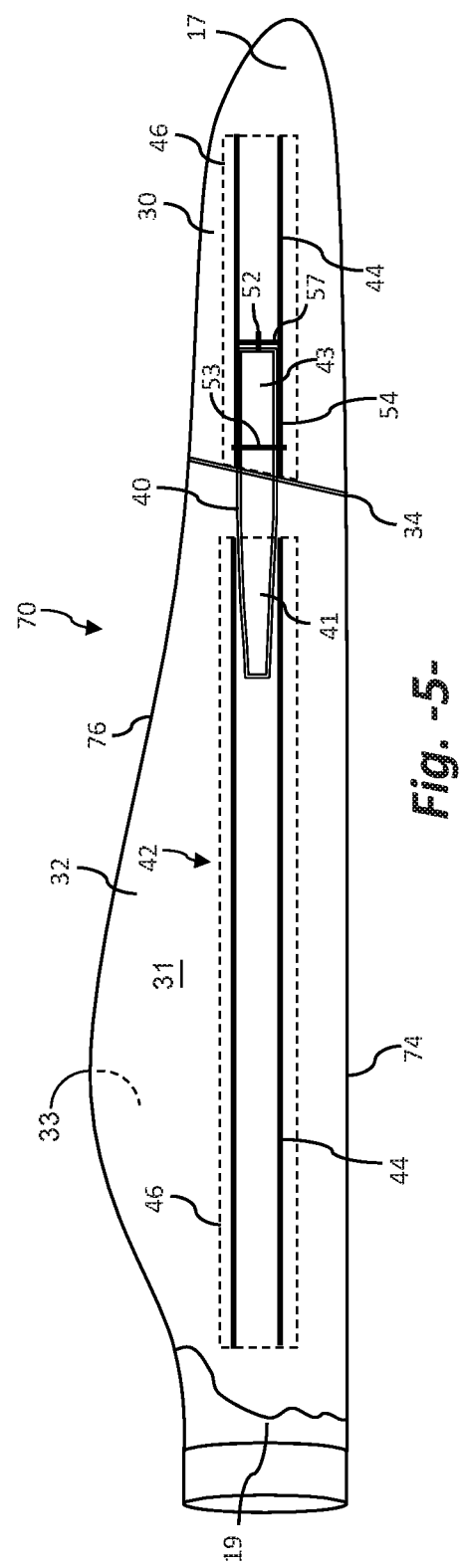
Fig. -5-

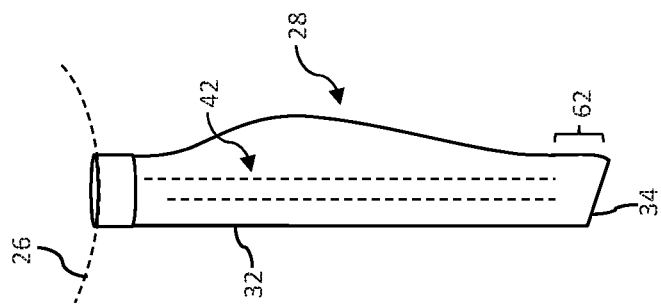
Fig. -6d-
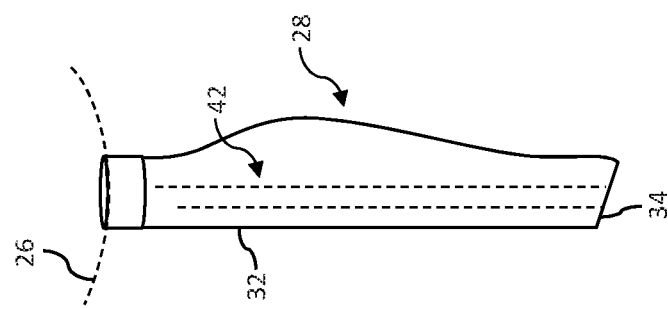
Fig. -6c-
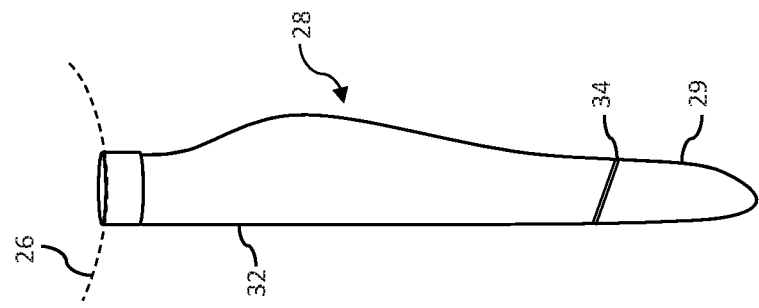
Fig. -6b-
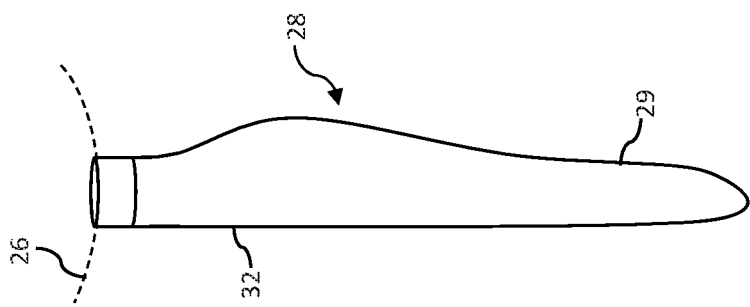
Fig. -6a-

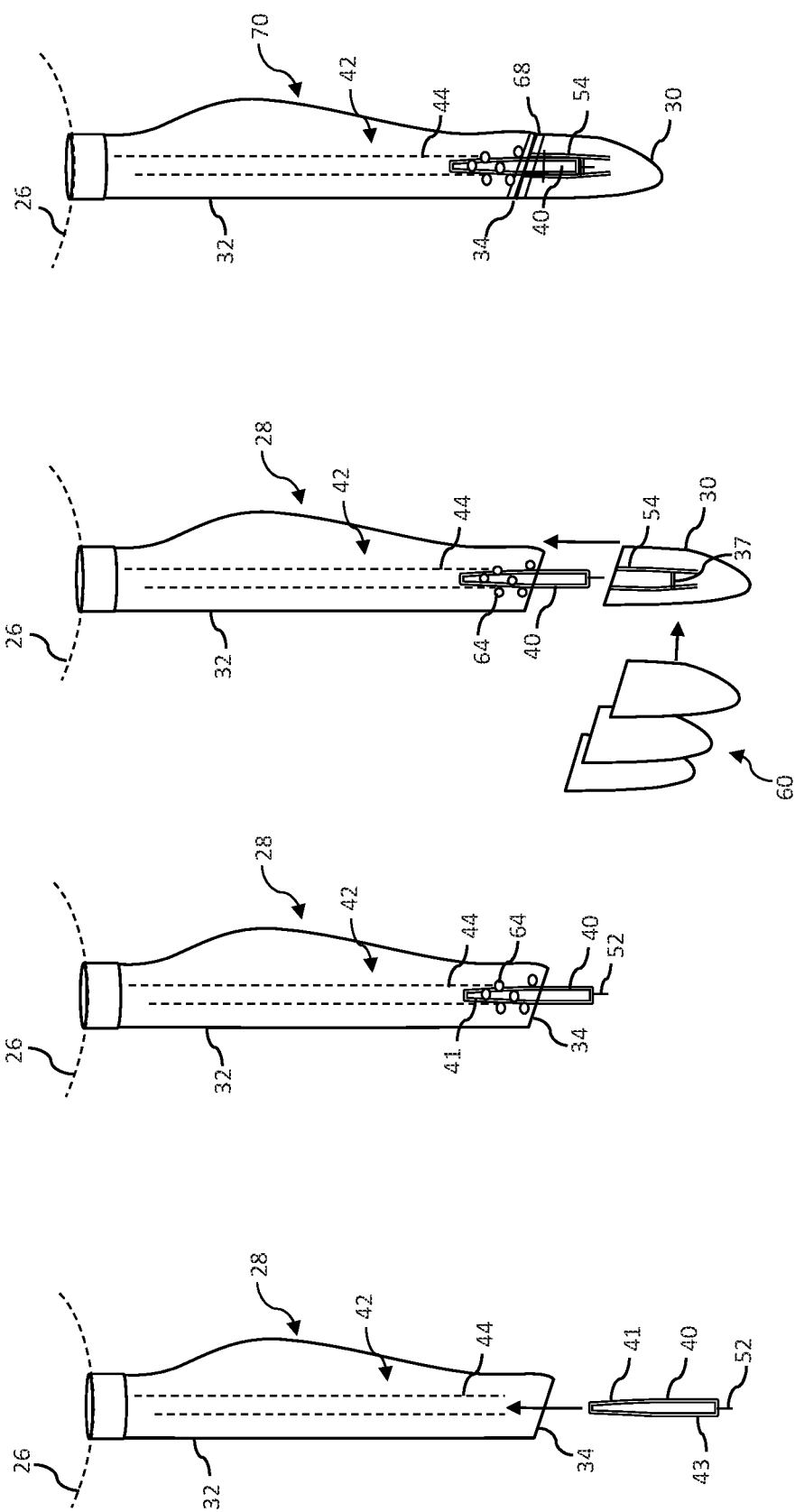

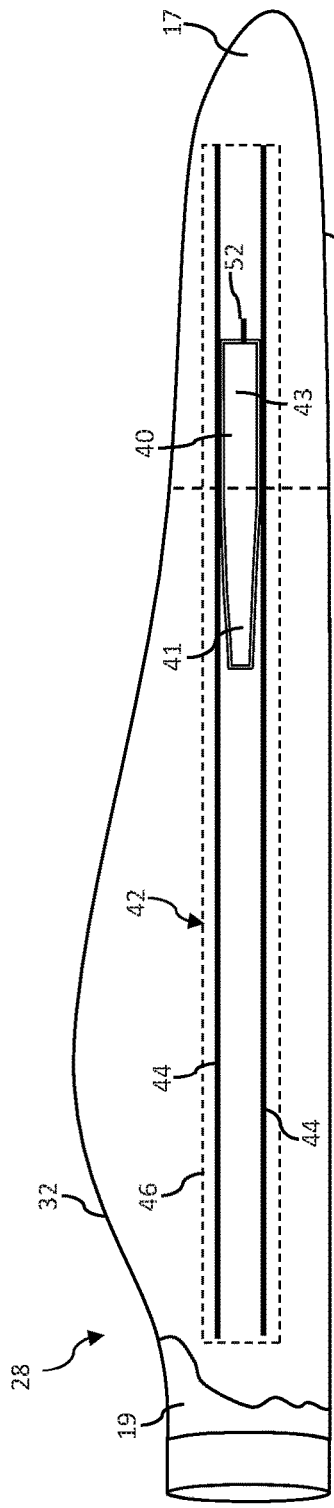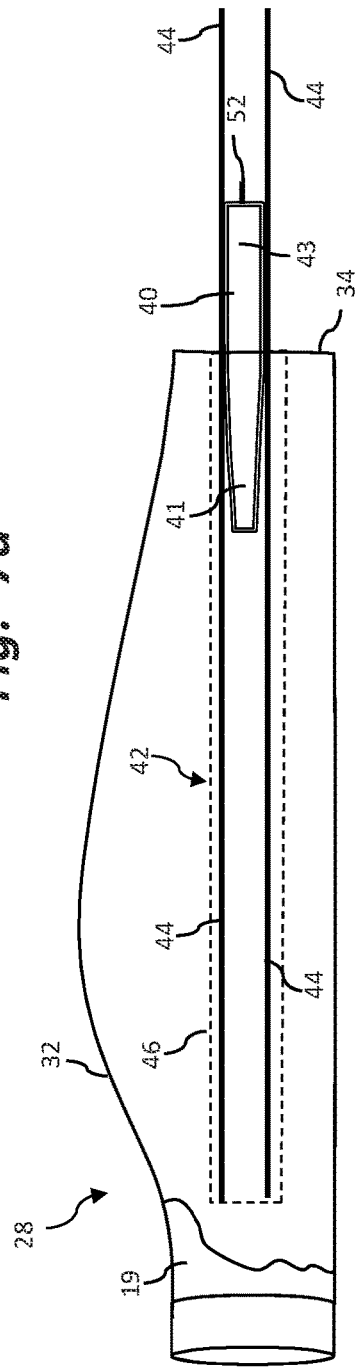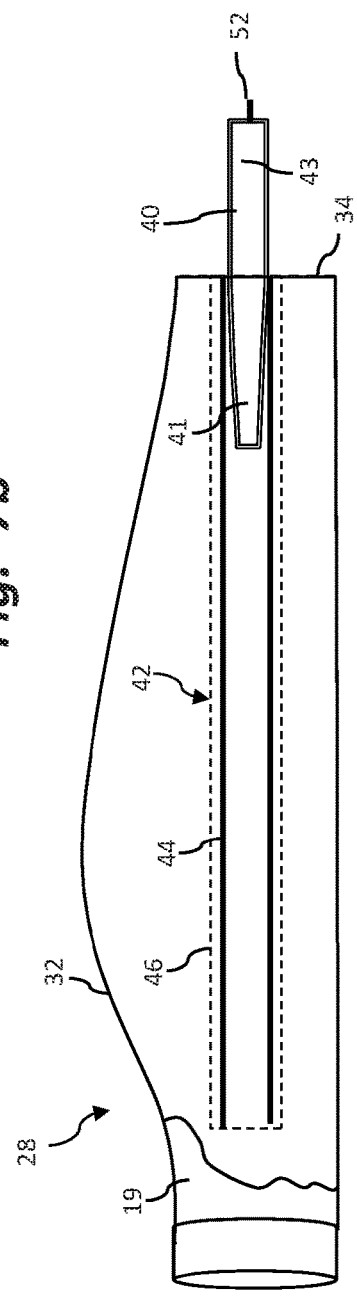

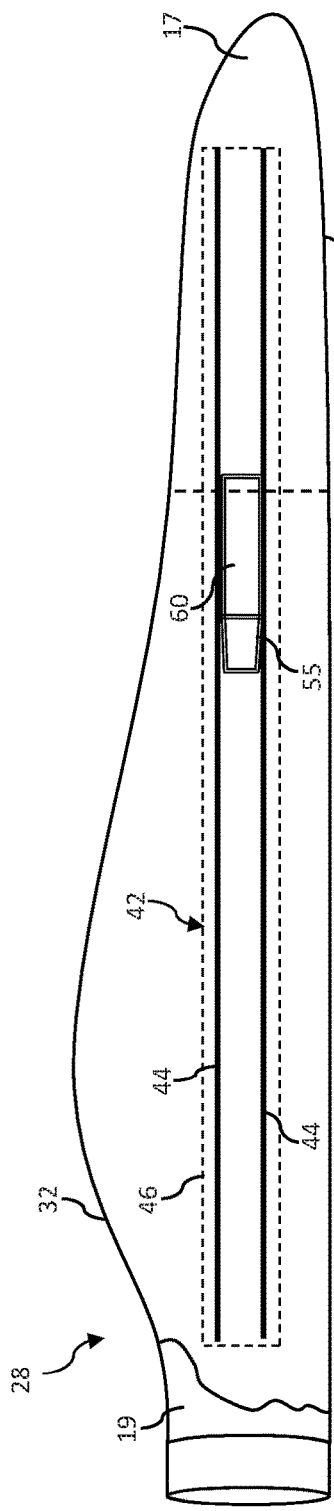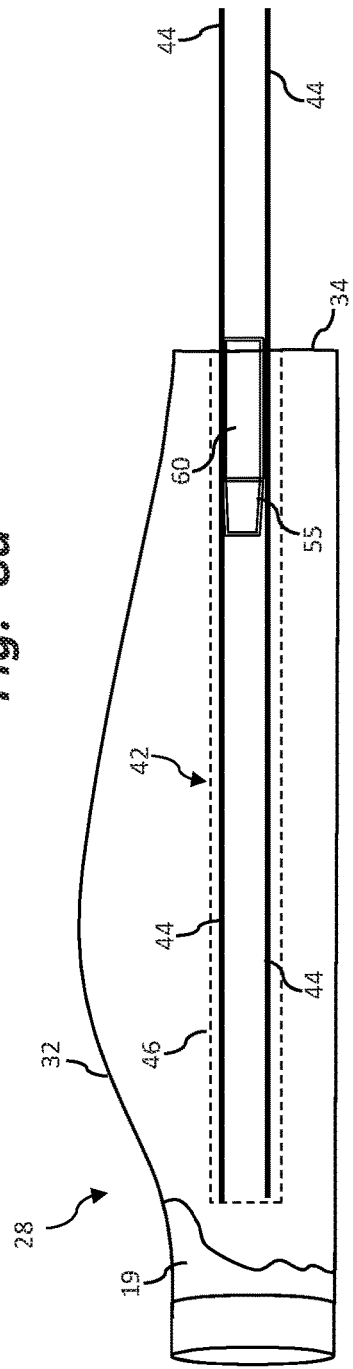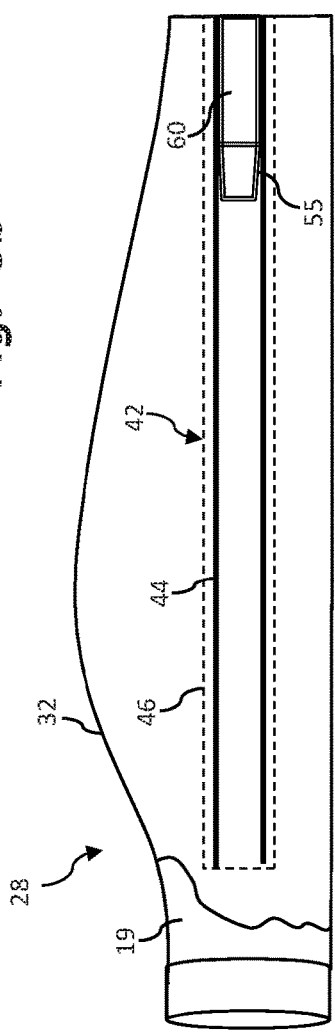

METHOD TO RETROFIT A WIND TURBINE ROTOR BLADE WITH A REPLACEMENT BLADE TIP SEGMENT

FIELD

The present subject matter relates generally to wind turbine rotor blades and, more particularly, to a method for field retrofit of the existing blade tip segment with a replacement blade tip segment.

BACKGROUND

Wind power is considered one of the cleanest, most environmentally friendly energy sources presently available, and wind turbines have gained increased attention in this regard. A modern wind turbine typically includes a tower, generator, gearbox, nacelle, and one or more rotor blades. The rotor blades capture kinetic energy from wind using known foil principles and transmit the kinetic energy through rotational energy to turn a shaft coupling the rotor blades to a gearbox, or if a gearbox is not used, directly to the generator. The generator then converts the mechanical energy to electrical energy that may be deployed to a utility grid.

Wind turbine rotor blades generally include a body shell formed by two shell halves of a composite laminate material. The shell halves are generally manufactured using molding processes and then coupled together along the corresponding ends of the rotor blade. In general, the body shell is relatively lightweight and has structural properties (e.g., stiffness, buckling resistance, and strength) which are not configured to withstand the bending moments and other loads exerted on the rotor blade during operation.

In certain situations, it may be desirable to modify a rotor blade on an operational field wind turbine. For example, it may be desired to change the physical characteristics of the blade for noise reduction benefits, or to change the power characteristics of the blade. Such modification may call for replacement of the existing blade tip with a different blade tip segment. However, retrofit of an existing blade tip is a difficult and challenging process, particularly if the process is conducted in the field (at the wind turbine site). In addition, the joint between the replacement blade tip segment and the existing blade root segment typically dictates the maximum load limit for the blade. Thus, retrofitted blade tip segments have been limited to relatively short lengths.

As the size of wind turbine rotor blades have significantly increased in recent years, difficulties have emerged in the integral manufacture as well as conveyance and transport of the blades to a site. In response, the industry is developing sectional wind turbine rotor blades wherein separate blade segments are manufactured and transported to a site for assembly into a complete blade (a "jointed" blade). In certain constructions, the blade segments are joined together by a beam structure that extends span-wise from one blade segment into a receiving section of the other blade segment. Reference is made, for example, to US Patent Publication No. 2015/0369211, which describes a first blade segment with a beam structure extending lengthways that structurally connects with a second blade segment at a receiving section. The beam structure forms a portion of the internal spar structure for the blade and includes a shear web connected with a suction side spar cap and a pressure side spar cap. Multiple bolt joints are provided on the beam structure for connecting with the receiving section in the second blade segment, as well as multiple bolt joints located at the chord-wise joint between the blade segments.

Similarly, US Patent Publication No. 2011/0091326 describes a jointed blade wherein a first blade portion and a second blade portion extend in opposite directions from a joint. Each blade portion includes a spar section forming a structural member of the blade and running lengthways, wherein the first blade portion and the second blade portion are structurally connected by a spar bridge that joins the spar sections. The spar bridge may be an extension of one of the spar sections that is received in a receiving spar section of the other blade portion. As the extending spar section may be received in the receiving spar section, the extending spar caps and the receiving spar caps may overlap each other along at least a part of the length of the extending spar section. To limit the material thickness of the overlapping spar caps, the references describes that the thickness of the receiving spar caps may be tapered down towards the joint, i.e. along at least a part of the length of the receiving spar section.

The jointed blade structures have not, however, been implemented in a manner suitable for retrofitting of existing blades. Therefore, a viable method of retrofitting operational blades in the field using jointed blade structure to allow for use of longer blade tip segments would be an advantageous advancement in the art.

BRIEF DESCRIPTION

Aspects and advantages of the invention will be set forth in part in the following description, or may be obvious from the description, or may be learned through practice of the invention.

In one aspect, the present disclosure is directed to a method for retrofitting a wind turbine blade with a replacement blade tip segment. The method includes providing a replacement blade tip segment having an internal beam receiver section, such as an open-ended box-beam configuration. A complimentary beam structure is also provided, such as a box-beam structure, having a size so as to slide within the receiver section. The existing blade tip segment is cut away from the wind turbine blade, wherein the cut defines a chord-wise joint line at the remaining blade root segment of the blade. The beam structure is then fitted into and fixed to the existing spar structure of the blade root segment. The replacement blade tip segment is then aligned in a span-wise orientation and connected with the blade root segment so that the beam structure moves into the beam receiver section. Once the replacement blade tip segment is fixed to the blade root segment, for example by using bolts or pins at various locations to connect the beam structure within the receiver section, the blade shell components can be repaired or finished at the joint line, for example a fiberglass, epoxy or other repair type finish process.

In a certain embodiment, the wind turbine blade is operational on a wind turbine at a field site, wherein the retrofitting process is performed with the wind turbine blade in an up-tower position on the wind turbine rotor hub. Alternatively, the wind turbine blade can be removed and lowered from the hub using any suitable process and the retrofitting process is performed with the wind turbine blade in a down-tower position relative to the rotor hub. In still other embodiments, the retrofitting process may be performed at any suitable off-site location.

The beam receiver section may be formed separately from the replacement blade tip segment and incorporated with spar structure in the replacement blade tip segment. Alternatively, the beam receiver section may be formed as an integral portion or component of the spar structure.

The replacement blade tip segment can be pre-produced and transported to the field site for the retrofitting process. In a certain embodiment, it may be desirable to produce and maintain an inventory of the replacement blade tip segments, wherein for the retrofitting process, one of the replacement blade tip segments is selected from the inventory and transported to the field site.

Certain embodiments may include modifying the spar structure in the blade root segment to accept the beam structure. These modifications may include, for example, removal of a span-wise section of the shear webs adjacent to the joint line, wherein a tapered end of the beam structure is then fitted between the remaining shear webs such that an opposite end of the beam structure extends from the shear webs and becomes an extension of the spar structure.

In addition, certain embodiments may include modifying the blade root segment to accept the beam structure by tapering a section of the shell components of the blade root segment towards the joint line. This tapered section allows for a partial overlap with the shell components of the replacement blade tip segment and accommodates insertion of the beam structure into the spar structure in the blade root segment.

In order to fix the beam structure to the spar structure in the blade root segment of the blade, one embodiment of the method includes drilling a span-wise pattern of holes through a blade shell component of the blade root segment to provide internal access to the beam structure and spar structure, and then sequentially injecting an adhesive into the holes. The pattern of holes may be defined to allow injection of the adhesive between the tapered end of the beam structure and shear webs along a portion of the beam structure, and around the beam structure where the section of the shear webs is removed adjacent the joint line. In this sequential injection process, a first one or ones of the holes are injected until the adhesive flows from the adjacent hole or holes. Then, the injected hole is plugged or sealed, and the adjacent hole is injected. This process progresses along the pattern of holes to ensure a complete injection with no or minimal internal voids between the beam structure and existing spar structure and shell components.

The finishing process on the blade shell components may include any conventional repair or finishing technique to provide a relatively smooth and aerodynamic surface at the join line between the shell components of the replacement blade tip segment and the root-end blade segment. The finish may include application of a seal band wrapped around the blade shell components at the joint line.

The present invention also encompasses a method for manufacturing a wind turbine blade that is pre-staged for subsequent retrofitting with a replacement blade tip segment. An embodiment of this method includes providing the wind turbine blade with a continuous spar structure from a root section to a tip section of the blade. This spar structure may include, for example, opposite shear webs and opposite spar caps that define a box-beam spar structure. At a pre-defined span-wise location, one of a span-wise extending beam structure or a span-wise extending receiver section is incorporated with the spar structure by fixing a root-end of the beam structure or receiver section with the spar structure. A tip end of the beam structure or the receiver section is free of the spar structure. If used, the beam structure has a size for insertion into a mating receiver section within the replacement blade tip segment at a later time. Likewise, if used, the receiver section is sized for receipt of a mating beam structure extending from the replacement blade tip segment. In the embodiment wherein the spar structure includes opposite shear webs, the root-end of the beam structure or receiver section may be fixed between the shear webs, for example with an adhesive.

The method may further include retrofitting the wind turbine blade with the replacement blade tip segment at a time subsequent to manufacture of the wind turbine blade by cutting an existing blade tip segment from the wind turbine blade at a chord-wise joint line such that the tip-end of the beam structure extends span-wise from a remaining blade root segment beyond the chord-wise joint line, or the receiver section is exposed at the chord-wise joint line. Spar structure in the blade root segment that extends along the tip-end of the beam structure or receiver section may also be removed such that only the beam structure extends from the blade root segment or the receiver section is exposed at the chord-wise joint line. Then, the replacement blade tip segment is aligned and connected with the blade root segment in a span-wise direction so that the beam structure moves into the receiver section of the replacement blade tip segment, or a beam structure extending from the replacement tip segment slides into the receiver section. Then, a finish surface can be provided to the blade shell components of the blade root segment and the replacement tip segment at the joint line.

As discussed above, the spar structure may include opposite shear webs, wherein the root-end of the beam structure or receiver section is between and fixed to the shear webs, and wherein the removing of the spar structure comprises cutting away the shear webs along the tip-end of the beam structure or the tip end of the receiver section.

Other aspects of the retrofitting process discussed above are applicable to the blade manufacturing and subsequent retrofitting method.

These and other features, aspects, and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 illustrates a perspective view of one embodiment of a wind turbine that may utilize a retrofitted blade according to the present disclosure;

FIG. 2 conceptually depicts retrofitting of a wind turbine rotor blade with a replacement tip blade segment in accordance with the present disclosure;

FIG. 3 is a view of an embodiment of a root-end blade segment with a beam structure fixed therein;

FIG. 4 is a view of an embodiment of a replacement tip blade segment with a receiver section fixed or formed therein;

FIG. 5 is a partial cut-away view of a retrofitted wind turbine blade in accordance with an embodiment of the present disclosure;

FIGS. 6a through 6h are sequential conceptual views of an embodiment of a retrofitting process in accordance with aspects of the present disclosure;

FIGS. 7a through 7c are sequential conceptual views of an embodiment for manufacture and subsequent retrofit of a wind turbine blade in accordance with aspects of the present disclosure; and FIGS. 8a through 8c are sequential conceptual views of an alternative embodiment for manufacture and subsequent retrofit of a wind turbine blade in accordance with aspects of the present disclosure

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present subject matter is directed to methods for retrofitting existing wind turbine rotor blades (including operational blades in the field) with a replacement blade tip segment.

Referring now to the drawings, FIG. 1 is a side view of an exemplary wind turbine 10 having a plurality of rotor blades 28 that may be retrofitted in accordance with aspects of the present disclosure. The illustrated wind turbine 10 is a horizontal-axis wind turbine. Alternatively, the wind turbine 10 may be a vertical-axis wind turbine. The wind turbine 10 includes a tower 12 that extends from a support surface 14, a nacelle 16 mounted on the tower 12, a generator 18 positioned within the nacelle 16, a gearbox 20 coupled to the generator 18, and a rotor 22 that is rotationally coupled to the gearbox 20 with a rotor shaft 24. The rotor 22 includes a rotatable hub 26, with the rotor blades 28 coupled to and extending outward from the rotatable hub 26. Each rotor blade 28 includes a blade tip 17 and a blade root 19, and corresponding root-end blade segment 32 and a tip-end blade segment 29.

FIG. 2 is a conceptual plan view of a retrofitting process in accordance with aspects of the present disclosure wherein the existing rotor blade 28 is made into a jointed rotor blade by cutting out the existing blade tip segment 29 and fitting a replacement blade tip segment 30 to the root-end blade segment 32 (indicated by arrow 38). Referring also to FIG. 5, in the resulting retrofitted jointed blade 70, the root-end blade segment 32 and replacement blade tip segment 30 extend in opposite directions from a chord-wise joint 34. Each of the blade segments 30, 32 includes a pressure side shell member 31 and a suction side shell member 33. The blade segments 30, 32 are connected by internal joint structure 36 extending into both blade segments 30, 32 to facilitate joining of the blade segments 30, 32, as described in greater detail below. The blade 70 includes a leading edge 74 and a trailing edge 76, as well as the root portion 19 and tip portion 17. The blade 28 extends in a longitudinal, span-wise direction and, as is well known in the art, the upper and lower shell member 31, 33 are joined together at the leading edge 74 and trailing edge 76. The blade 70 includes an internal cavity in which various structural members, such as spar caps 46 and shear webs 44 are configured.

The construction and function of the internal structural components of the blade 70 are well known to those skilled in the art and need not be described in detail herein for an understanding and appreciation of the present invention.

Aspects of the present method include separately producing the replacement blade tip segment 30 with an internal beam receiver section 54, as shown in FIGS. 2, 4, and 5, intended for receipt of a beam structure 40 fixed in the blade root segment 32. The internal joint structure 36 associated with the receiving section includes spar structure components 42 that extend span-wise for connecting with the beam structure 40 along a length of the receiving section 54. The spar structure components 42 may include shear webs 56 and spar caps 58 configured in a box-beam having an open end adjacent the chord-wise joint 34. The receiving section 54 may include a wall 57, as explained in greater detail below.

As seen particularly in FIGS. 4 and 5, the receiving section 54 may be formed integral with the spar structure 42 in the replacement blade tip segment, wherein the receiving section 54 is essentially delimited by the wall 57. In an alternate embodiment, the receiving section 54 may be a separately produced box-beam component that is fitted into and fixed to the existing spar structure 42 in the replacement blade tip segment 30.

The receiving section 54 may include any combination of bolts or pins 53 and associated slots 50 for interconnecting with corresponding pins or slots of the beam structure 40. For example, a slot 50 may be provided in the wall 57 of the receiving section 54 for receipt of a pin 52 fixed on the end face of tip-end 43 of the beam structure 40. The beam structure 40 may also include opposite slots 50 proximate to the chord-wise joint 34 and oriented in a chord-wise direction. There may be a bushing within each slot 50 arranged in a tight interference fit with a chord-wise extending pin 53 that extends through the shear webs 56 in the receiving section 54 and the beam structure 40 to fix the beam structure 40 in the receiving section 54.

The replacement blade tip segment 30 can be pre-produced and transported to the field site for the retrofitting process. It may be desirable to produce and maintain an inventory 60 (FIG. 6g) of the replacement blade tip segments 30, wherein for the retrofitting process, one of the replacement blade tip segments 30 is selected from the inventory 60 and transported to the field site.

Referring to FIGS. 3 and 5, the beam structure 40 is also a separately formed component of the joint structure 36, and is configured to be fitted and fixed into the existing spar structure 42 within the blade root segment 32. In a particular embodiment, the beam structure 40 includes a root end 41 and a tip end 43, and may be configured as a box-beam structure having opposite spar caps and interconnecting shear webs. Other configurations are also possible, including a solid member. The root end 41 may be tapered in the span-wise direction for easier insertion and fixing between the shear webs 44 in the blade root segment 32. An inventory of the beam structures 40 may be produced and stored for use on an "as-needed" basis.

Referring to FIG. 3, the method may include modifying the existing spar structure 42 in the blade root segment 32 to accept the root end 41 of the beam structure 40. These modifications may include, for example, removal of a span-wise section 62 of the shear webs 44 adjacent to the joint line 34. The spar caps 46 may also be removed along this section 62. The blade shell components 31, 33 may also be tapered towards the joint line 34 along the section 62. This tapered section allows for a partial overlap with the shell components 31, 33 of the replacement blade tip segment 30 and accommodates insertion of the beam structure 40 into the spar structure 42 in the blade root segment 32.

After these modifications, the tapered end 41 of the beam structure 40 is then fitted between the remaining shear webs 44 such that the opposite tip end 43 of the beam structure 40 extends from the shear webs 44 span-wise beyond the chord-wise joint line 34. The beam structure 40 thus becomes an extension of the spar structure 42 of the blade root segment 32.

Various methods may be used in order to fix the beam structure 40 to the spar structure 42 in the blade root segment 32. In a particular embodiment depicted in FIG. 3, the method includes drilling a span-wise pattern of holes 64 through a blade shell component 33 to provide internal access to the beam structure 40 and remaining spar structure 42. The pattern of holes 64 can be defined relatively broadly in the area 62 where portions of the spar structure 42 have been removed so that adhesive injected through these holes 64 will essentially fill the internal area between the shells 31, 33. The pattern of holes 64 can narrow towards the spar structure 42 until the holes 64 are located between the shear webs 44 so that adhesive injected in these holes 64 essentially fills any space between the beam structure 40 and spar structure 42 along the section 66. The adhesive is injected sequentially starting at the joint line 34 (which is blocked off for this process), wherein a first one or ones of the holes 64 are injected until the adhesive flows from the adjacent hole or holes 64. Then, the injected hole 64 is plugged or sealed, and the adjacent hole 64 is injected until the adhesive flows from the next downstream hole 64. This injection process progresses along the pattern of holes 64 to ensure a complete injection with no or minimal internal voids between the beam structure 40 and existing spar structure 42 and shell components 31, 33.

FIGS. 6a through 6h sequentially depict an embodiment of the current method in the field with the existing rotor blade 28 remaining attached to a rotor hub 26, wherein the retrofitting process is performed with the blade 28 remaining in the uptower position on the hub 26. Alternatively, the existing wind turbine blade 28 can be removed and lowered from the hub 26 using any suitable process and the retrofitting process is performed with the wind turbine blade 28 in a down-tower position relative to the rotor hub 26.

FIG. 6a depicts an existing rotor blade 28 on the rotor hub 26 at a six o'clock position, the blade 28 including the root-end blade segment 32 and integral blade tip segment 29.

FIG. 6b depicts a chord-wise cut made in the blade 28 at a location that defines a chord-wise joint line 34. This cut is made completely through the blade 28, wherein the existing blade tip segment 29 is removed, as depicted in FIG. 6c. The remaining spar structure 42 is depicted in the blade root segment 32.

FIG. 6d depicts modification of the blade root segment 32 adjacent to the joint line 34, including removal of a section of the spar structure 42 along the section 62 and possible tapering of the shell components 31, 33, as discussed above.

FIG. 6e depicts span-wise insertion of the separately formed beam structure 40 into the modified spar structure 42, wherein the tapered root end 41 is inserted between the shear webs 44 in the blade root segment 32.

FIG. 6f depicts the process of fixing the beam structure 40 to the spar structure 42 with the adhesive injection process discussed above.

FIG. 6g depicts selection of one of the preformed replacement blade tip segments 30 from the inventory 60 and span-wise connection of the segment 30 with the blade root segment 32. In particular, as the replacement blade tip segment 30 is moved in the span-wise direction, the receiving section 54 within the segment 30 slides onto the portion of the beam structure 40 extending beyond the joint line 34. To fix the beam structure 40 with the receiving section 54, the end pin 52 on the root end 43 of the beam structure 40 extends through a slot in the wall 37 of the receiving section 54, and chord-wise oriented slots 50 in the receiving section 54 align with corresponding slots 50. The chord-wise pin 53 is then inserted through the aligned slots 50, as particularly seen in FIG. 5.

FIG. 6h depicts the replacement blade tip segment 30 fixed to the blade root segment 32 and the blade shell components provided with a finish at the joint line 34, for example a fiberglass, epoxy or other repair type finish that provides a relatively smooth and aerodynamic surface at the join line 34 between the shell components of the replacement blade tip segment 30 and the root-end blade segment 32. The finish may include a seal band 68 wrapped around the blade shell components 31, 33 at the joint line 34. Thus, the blade in FIG. 6h is a complete retrofitted blade 70 as also depicted in FIG. 5.

As depicted generally in FIGS. 7a-7c and 8a-8c, the present invention also encompasses a method for manufacturing a wind turbine blade 28 that is pre-staged for subsequent retrofitting with a replacement blade tip segment. A particular embodiment of this method is depicted in FIGS. 7a-7c. The wind turbine blade 28 is provided with a continuous spar structure 42 from a root section 19 to a tip section 17 of the blade, as with any number of conventional wind turbine blade designs. This spar structure 42 may include, for example, opposite shear webs 44 and opposite spar caps 46 that define a box-beam spar structure 42. At a pre-defined span-wise location, a span-wise extending beam structure 40 is incorporated with the spar structure 42 during fabrication of the blade 28 by fixing a root-end 41 of the beam structure 40 with the spar structure 42 and leaving a tip-end 43 of the beam structure 40 essentially unattached to the spar structure 42. As discussed in detail above, the beam structure 40 has a size for insertion into a receiver section 54 (FIG. 5) within a replacement blade tip segment 30 at a later time. In the embodiment wherein the spar structure 42 includes opposite shear webs 44, the root-end 41 of the beam structure 40 may be fixed between the shear webs 44, for example with an adhesive.

FIGS. 7b and 7c depict preparing the wind turbine blade 28 for subsequent retrofitting with a replacement blade tip segment, as discussed above, by cutting at least the shell components of the existing blade tip segment 29 from the wind turbine blade 28 at a chord-wise joint line 34 such that the tip-end 43 of the beam structure extends span-wise from a remaining blade root segment 32 beyond the chord-wise joint line 34. Spar structure 42 in the blade root section 32 that extends along the tip-end 43 of the beam structure 40 may be removed at the same time or after cutting away of the blade shell components so only the beam structure 40 extends from the blade root segment 32, as depicted in FIG. 7c. Then, a replacement blade tip segment 30 can be aligned and connected with the blade root segment 32 in the retrofitting process discussed above.

The embodiment of FIGS. 8a-8c is drawn to providing the wind turbine blade 28 with a pre-staged receiver section 60 having a root end 55 fixed to the spar structure 42. An opposite end of the receiver section 60 extends at least to the location of the chord-wise joint line 34 and may be fixed to the webs 44 along the complete length of the receiver section 60. As depicted in FIGS. 8b and 8c, when the blade tip segment 29 is cut away from the blade 28, the spar structure, including the webs 44 are cut back to the joint line 34. If the receiver section 60 extends beyond the joint line 34 (as depicted in FIG. 8*b*), then this length of the receiver section 60 may also be trimmed to the joint line 34 such that an open end of the receiver section 60 is exposed at the joint line (FIG. 8*c*) for receipt of a beam structure that would extend from the replacement blade tip segment.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for retrofitting a wind turbine blade with a replacement blade tip segment, comprising:
    providing a replacement blade tip segment with an internal beam receiver section;
    cutting an existing blade tip segment from the wind turbine blade, wherein the cut defines a chord-wise joint line at a remaining blade root segment of the wind turbine blade;
    providing a beam structure that is separate from the blade root segment;
    inserting the beam structure into the blade root segment and fixing the beam structure into spar structure of the blade root segment;
    aligning and connecting the replacement blade tip segment with the blade root segment a span-wise direction so that the beam structure moves into the beam receiver section; and
    providing a finish surface to blade shell components of the blade root segment and the replacement tip segment at the joint line.

2. The method of claim 1, wherein the wind turbine blade is operational on a wind turbine at a field site, comprising performing the retrofitting process with the wind turbine blade in an up-tower position on a rotor hub of the wind turbine.

3. The method of claim 1, wherein the wind turbine blade is operational on a wind turbine at a field site, comprising removing and lowering the wind turbine bade from a rotor hub of the wind turbine and performing the retrofitting process with the wind turbine blade in a down-tower position relative to the rotor hub.

4. The method of claim 1, wherein the internal beam receiver section is formed separately from the replacement blade tip segment and incorporated with spar structure in the replacement blade tip segment.

5. The method of claim 4, wherein the replacement blade tip segment is pre-produced and transported to a field site for the retrofitting process.

6. The method of claim 5, further comprising producing and maintaining an inventory of the replacement blade tip segments, wherein for the retrofitting process, one of the replacement blade tip segments is selected from the inventory and transported to the field site.

7. The method of claim 1, further comprising modifying the spar structure in the blade root segment to accept the beam structure by removing a section of shear webs adjacent to the joint line, and moving a tapered end of the beam structure between the shear webs such that an opposite end of the beam structure extends span-wise from and becomes an extension of the spar structure.

8. The method of claim 7, wherein the fixing of the beam structure into the spar structure of the blade root segment comprises drilling a span-wise pattern of holes through a blade shell component of the blade root segment to provide access to the beam structure and spar structure, and sequentially injecting an adhesive into the holes.

9. The method of claim 8, wherein the pattern of holes allows injection of the adhesive between the tapered end of the beam structure and shear webs along a portion of the beam structure, and around the beam structure where the section of the shear webs is removed adjacent the joint line.

10. The method of claim 7, further comprising tapering a section of shell components of the blade root segment from towards the joint line.

11. The method of claim 1, wherein the providing a finish surface to the joint line comprises wrapping a seal around the wind turbine blade at the joint line.

* * * * *